O. DREGER.
NUT LOCK.
APPLICATION FILED AUG. 22, 1911.
1,037,739.
Patented Sept. 3, 1912.
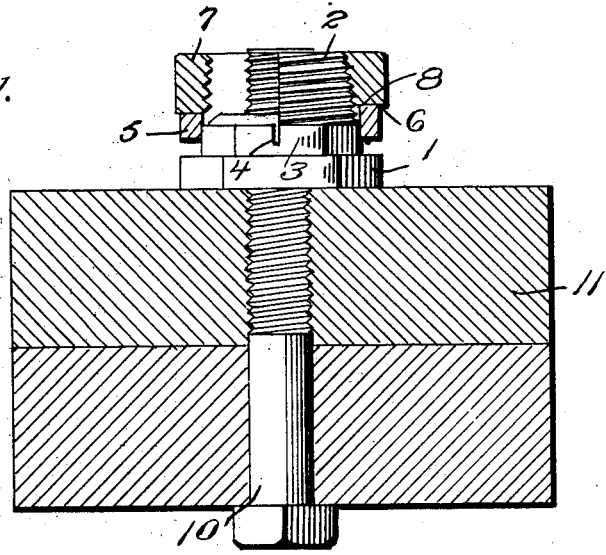
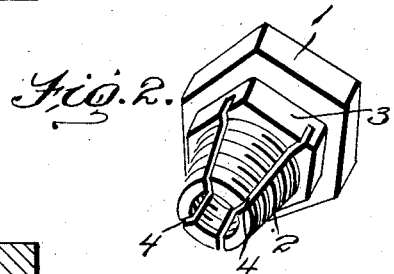
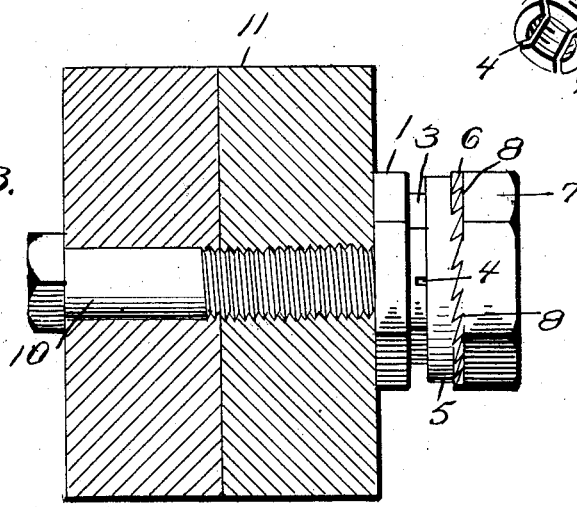
Inventor
Oscar Dreger.
Witnesses
By _____, Attorneys

UNITED STATES PATENT OFFICE.

OSCAR DREGER, OF HUNTSVILLE, ALABAMA.

NUT-LOCK.

1,037,739.

Specification of Letters Patent. Patented Sept. 3, 1912.

Application filed August 22, 1911. Serial No. 645,336.

*To all whom it may concern:*

Be it known that I, OSCAR DREGER, citizen of the United States, residing at Huntsville, in the county of Madison and State of Alabama, have invented certain new and useful Improvements in Nut-Locks, of which the following is a specification.

My invention comprehends certain new and useful improvements in nut locks, and has for its main object to provide a nut locking device which will positively hold the nut in its engaged position.

As a further object my invention aims to provide a nut locking device, simple in its construction and therefore capable of being easily and cheaply manufactured.

With these and other objects in view as will more fully appear as the description proceeds my invention consists in certain constructions, arrangements and combinations of the parts that I shall hereinafter fully describe and claim.

For a full understanding of the invention reference is to be had to the following description and accompanying drawing, in which:

Figure 1 shows my device in operation in a vertical position in the preferred embodiment thereof; and also shows a partial sectional view; Fig. 2 is a perspective view of the nut with the locking washer removed; Fig. 3 shows an elevation of the device in operation.

Corresponding and like parts are referred to in the following description and indicated in all the views of the accompanying drawing by the same reference characters.

Referring to the drawing, an internally threaded nut comprises at one end a hexagonally formed member 1 for wrench engagement, the other end 2 being tapered and provided with an external thread. Intermediate the threaded portion 2 and the hexagonal end 1 the nut is provided with a hexagonal shoulder 3 of approximately the same diameter as the threaded portion 2 and is cut by longitudinal slots 4 extending through the tapered portion 2 and part way through the hexagonal shoulder 3. A circular washer 5 of a diameter approximately equal to that of the portion 1 is formed with a hexagonal opening corresponding to the shape of the shoulder 3 and is mounted thereon and is free to move longitudinally on said shoulder. The face of said washer adjoining the portion 1 is flat. The other face 6 is provided with ratchet teeth of steep pitch. An internally tapered, threaded nut 7 engages the threaded portion 2 of the nut, the outer face being flat and the inner face 8 provided with ratchet teeth for engagement with the teeth of the washer 5.

For the purpose of this description, a bolt 10 on which my nut locking device is mounted, is shown passing through work 11.

From the foregoing description in connection with the accompanying drawing, the operation of my improved device will be apparent. The nut locking device being assembled by mounting the washer 5 upon the shoulder 3 with the teeth facing outwardly, and screwing the nut 7 upon the tapered portion 2 of the main nut, the teeth arranged for engagement with the teeth of washer 5, the device is screwed upon the bolt 10 until the member 1 strikes the work 11. The nut 7 is then screwed down on the tapered portion 2 of the nut which by virtue of the taper and the slots 4 is forced to seize the bolt 10, thereby locking the two together. In order to maintain this locked position the washer 5 is shoved into engagement with the toothed nut 7 which is slightly unscrewed to make this engagement possible. The extreme pitch of the interlocked teeth prohibits their disengagement unless the nut 7 is tightened which will not occur except through outside means. The engagement of the toothed washer with the toothed nut 7 prohibits the main nut from loosening and as it would never of itself tighten, it is apparent that the locking of the device is complete.

Having thus described the invention what is claimed as new is:

1. A nut lock embodying a main nut having a clamping portion adapted to engage a bolt, a secondary nut threaded on said portion and provided with teeth on its inner face, and a non-rotatable washer slidably mounted between the nuts and provided with teeth adapted to engage the teeth of the secondary nut and prevent independent rotation of the nuts.

2. A nut lock embodying a main nut provided with a tapered exteriorly threaded split extension adapted to engage a bolt, a secondary nut having undercut teeth on its inner face and mounted on the extension of the main nut, and a non-rotatable washer slidably mounted upon the main nut adjacent to the secondary nut and provided with undercut teeth adapted to engage the teeth of the latter.

3. A nut lock embodying a main nut having a tapered and threaded longitudinally split extension, an internally tapered secondary nut adapted to screw on the extension, and a washer interposed between the two nuts and provided with means co-acting with the main nut to prevent rotation thereof, said washer and the secondary nut being provided with interengaging undercut teeth on their adjacent faces.

4. A nut lock embodying a main nut having a portion adapted to clamp about a bolt, a secondary nut threaded on said portion and provided with undercut teeth, a washer slidably mounted between the nuts and provided with undercut teeth adapted to engage the teeth of the secondary nut, and means provided on the main nut to prevent the independent rotation of the washer thereon.

5. A nut locking device embodying a nut comprising a member for wrench engagement, an angular shoulder abutting against said member, and a tapered externally threaded extension from said shoulder provided with longitudinal slots, a washer provided with ratchet teeth on one side thereof, formed with an opening corresponding in shape to the aforementioned shoulder and designed to fit thereon, being capable of longitudinal movement, and a second nut mounted upon the threaded taper of the first nut and provided with ratchet teeth for engagement with the teeth of the washer.

In testimony whereof, I affix my signature in presence of two witnesses.

OSCAR DREGER. [L. S.]

Witnesses:
H. C. LAUGHLIN,
F. J. MATTHEWS.

---

Copies of this patent may be obtained for five cents each, by addressing the "Commissioner of Patents, Washington, D. C."